Patented May 2, 1933

1,906,961

UNITED STATES PATENT OFFICE

HERMANN HECKEL, OF CINCINNATI, OHIO, ASSIGNOR TO THE TWITCHELL PROCESS COMPANY, OF ST. BERNARD, OHIO, A CORPORATION OF OHIO

INK AND THE LIKE AND METHOD OF MAKING

No Drawing.   Application filed February 12, 1930. Serial No. 427,948.

This invention relates to inks, paints, varnishes, lacquers, and the like, wherein a pigment is combined with an oily organic vehicle to render it sufficiently fluid to be appropriately applied and the vehicle is so chosen or constituted that it will either harden or evaporate when exposed to the atmosphere in the form of a film on the surface to which it is applied.

The vehicles are usually composed of either drying oils, of which linseed oil is an example, or volatile petrolic or coal tar distillates of which naphtha and gasoline are examples. Often a volatile oil and a drying oil are mixed. The pigments vary infinitely in variety, some being organic, the majority, inorganic, but in each case there is involved the problem of getting a thorough mixture of the vehicle and the pigment, or otherwise expressed, in accomplishing a thorough and complete dispersion of the pigment throughout the vehicle. Often, if not usually, the pigment is ground in the vehicle. The color tone of the paint or ink is largely a function of the completeness of the dispersion and the thoroughness with which each and every particle of the pigment is enveloped and wet by the vehicle.

In the past it has been known that a thorough dispersion is desirable but the degree to which color power varies with dispersion has not fully appreciated nor the physical chemistry of the dispersion and color phenomenon fully investigated.

The object of this invention is not only to provide paints, inks, varnishes and the like, characterized by unique thorough dispersion, but also to provide a method of associating the pigment in the vehicle adapted to develop the full color power of the pigment with the least possible time, effort, handling and expense.

I have found that the oil soluble mineral oil sulphonates as a class are highly desirable in inks and paints of the character described for the reason that they effect the powers of the vehicle for wetting and enveloping the pigment particles, or otherwise expressed, that they disperse the pigment throughout the vehicle with great thoroughness and homogeneity and thereby bring out the full color tone of the pigment with very little physical working of the two together.

The mineral oil sulphonates are derived from the process of producing medicinal white oils and the light colored technical oils by treating a mineral oil with strong and/or fuming sulphuric acid and/or sulphur trioxide. As a result of this treatment two layers are formed, the upper layer known as the A layer or oil layer, and the lower layer known as the B layer or sludge layer. The sulphonates of the A layer are highly oil soluble and the sulphonates of the B layer are highly water soluble. The oil soluble sulphonates are known as mahogany sulphonates and are usually recovered from the oil layer by treating it with an aqueous alcoholic solvent. The sulphonates so recovered contain as a rule considerable entrained oil and may be further purified by distillation or by further extractions with higher proof alcoholic solvents. The sulphonates so treated to eliminate substantially all of the entrained oil or mother oil are called true mahogany.

If the mahogany sulphonates with the mother oil present be treated with a high proof alcoholic solvent, two layers are formed, one layer containing alcohol and sulphonates, the other layer, oil and sulphonates. The sulphonates in the oil layer are more highly oil soluble than those in the alcohol layer and if they be separated from the entrained oil or mother oil, they are particularly excellent dispersing agents.

The mahogany sulphonates, preferably devoid of entrained oil, are admixed with the vehicle of the ink or paint to be produced which is then combined with the pigment preferably by grinding the pigment into the vehicle. Tests have shown two grindings of a given percentage of a given pigment and a given vehicle producing a better color tone with 5% sulphonates present than was produced by seven grindings of the same quantities of the same vehicle and the same pigment without the sulphonates being used.

Otherwise expressed, it is possible by adding mahogany sulphonates to printing or lithographic inks or paints of the type specified to produce a desired color strength and color tone with considerable less percentage of pigment present than would be possible were no mahogany sulphonates used. The shortness of the ink or paint is, like color tone, somewhat a function of dispersion and it is therefore possible to produce a given shortness as well as a given color tone with a lesser percentage of pigment when the mahogany sulphonates are used. The mahogany sulphonic bodies may therefore be said to expedite the grinding and the dispersion of pigment in oil and to increase the fineness of the dispersion.

These combinations of pigment, vehicle and mahogany sulphonates are suitable for use as paints, varnishes, lacquers, printing inks, steel die inks, screen paints, lithographic inks, wall paper inks, and for many other purposes. Generally speaking, I prefer to use between 1 and 10% true mahogany sulphonates by weight, based on the weight of the varnish, for the reason that the non-drying oil present in the crude mahogany sulphonates is usually undesirable in bodies of this character. Moreover, the true mahogany sulphonates seem to have greater dispersing powers.

The mahogany sulphonates can be used either in the form of mahogany acid or in the form of a salt of mahogany acid. The following examples will generally illustrate the nature of some of these products, though I desire to be limited only by the claims.

*Example 1*

1 pound of lithol red is ground in 9 pounds of lithographic varnish No. 00 in which is dissolved 5% by weight of true mahogany sodium sulphonates. Before milling, the pigment is mixed with the varnish in the generally accepted manner, namely, through the use of a mixing mill. The resulting paste is then passed through a rolling mill two times in order to obtain the maximum color strength. This material is suitable for use as either a lithographic or a type ink.

*Example 2*

5 pounds of marine blue is mixed with an equal weight of lithographic varnish No. 00 which contains 5% by weight of true mahogany sodium sulphonates. The mixing is carried on as above in the usual form of mixing. The paste is then passed through a rolling mill two times when the maximum color strength is developed.

Lithol red is a lake prepared from sulpho B naphthalene azo beta naphthol, Color Index No. 189, Shultz No. 173.

Marine blue is a contraction of ultra marine blue, Color Index No. 1290, Shultz No. 970.

Lithographic Varnish No. 00 is a linseed oil thickened by heating. The numbers from 0000 to 0 and 0 to 8 represent increasing thickness or viscosity, No. 8 is very heavy Grade No. 2 being about the highest ordinarily used.

Having described my invention, I desire to be limited only by the ensuing claims:

1. The method of increasing the fineness of a dispersion of a pigment in an oily vehicle, said method, comprising, admixing said pigment and said vehicle and mahogany sulphonic bodies.

2. The method of increasing the fineness of a dispersion of a pigment in an oily vehicle, said method, comprising, admixing said pigment and said vehicle and true mahogany sulphonic bodies.

3. The method of expediting the grinding of a pigment in an oily vehicle, said method, comprising, grinding the pigment in the vehicle in the presence of mahogany sulphonic bodies.

4. The method of expediting the grinding of a pigment in an oily vehicle, said method, comprising, grinding the pigment in the vehicle in the presence of true mahogany sulphonic bodies.

5. A printing or lithographic ink, comprising, a pigment ground in a lithographic varnish containing between 1 and 10% mahogany sulphonates based on the weight of the varnish.

6. A printing or lithographic ink comprising, a pigment ground in a lithographic varnish containing between 1 and 10% true mahogany sulphonates based on the weight of the varnish.

7. In the process of dispersing a pigment in a varnish containing drying oil, the step of grinding said pigment in said varnish in the presence of between 1 and 10% mahogany sulphonic bodies based on the weight of the varnish.

8. In the process of dispersing pigments in a varnish containing drying oil, the step of dissolving between 1 and 10% true mahogany sulphonic bodies in said varnish and then grinding said pigment in said solution.

9. A liquid adapted to be used for pigmenting surfaces, said liquid comprising a pigment which has been dispersed in an oily vehicle by being ground therein in the presence of between 1 and 10% mahogany sulphonic bodies.

10. A new composition of matter comprising a linseed oil varnish suitable for the manufacture of inks containing between 1 and 10% true mahogany sulphonic bodies dissolved therein, said bodies adapted to expedite the dispersion of pigments therein.

11. A new composition of matter comprising a drying oil varnish suitable for the manufacture of inks containing between 1 and 10% true mahogany sulphonic bodies dissolved therein, said bodies adapted to expedite the dispersion of pigments therein.

12. In the art of manufacturing liquid coating compositions of the type exemplified by paints and inks, the method of incorporating a finely divided pigment in a liquid body and developing its coloring power therein, said method comprising grinding said pigment in an oil containing between 1 and 10% true mahogany sulphonic bodies and repeating said grinding until the desired color has been developed.

13. In the art of manufacturing liquid coating compositions of the type exemplified by lithographic inks, the method of incorporating a finely divided pigment in a liquid body and developing its coloring power therein, said method comprising grinding said pigment in an oil containing substantially 5% true mahogany sulphonic bodies and repeating said grinding until the desired color has been developed.

14. A new composition of matter comprising a linseed oil varnish suitable for the manufacture of lithographic inks containing substantially 5% true mahogany sulphonic bodies dissolved therein, said bodies adapted to expedite the dispersion of pigments therein.

15. A new composition of matter comprising a drying oil varnish suitable for the manufacture of inks containing substantially 5% true mahogany sulphonic bodies dissolved therein, said bodies adapted to expedite the dispersion of pigments therein.

16. A lithographic ink comprising a lithographic varnish solution containing about 5% true mahogany sulphonic bodies in which solution a finely divided pigment is dispersed.

17. In the art of manufacturing liquid coating compositions of the type exemplified by paints and inks, the method of incorporating a finely divided pigment in a liquid body and developing its coloring power therein, said method, comprising, grinding said pigment in an oil having a mahogany sulphonic content adapted to expedite the dispersion of the pigment in the oil and to increase the fineness thereof.

In witness whereof, I hereunto subscribe my name.

HERMANN HECKEL.